(12) United States Patent
Gras

(10) Patent No.: US 6,457,454 B1
(45) Date of Patent: Oct. 1, 2002

(54) METHOD AND DEVICE FOR OPERATING AN INTERNAL COMBUSTION ENGINE

(75) Inventor: Juergen Gras, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/745,507

(22) Filed: Dec. 22, 2000

(30) Foreign Application Priority Data

Dec. 22, 1999 (DE) .......................................... 199 61 943

(51) Int. Cl.$^7$ .......................... G06F 19/00; B60K 41/04; F02P 5/15; F02D 35/00
(52) U.S. Cl. ..................... 123/406.23; 701/84; 701/90; 701/102; 477/110; 477/111
(58) Field of Search ............................. 701/84, 85, 86, 701/87, 90, 101, 102; 477/110, 111; 123/406.23; 192/219.3; 74/335, 329, 330

(56) References Cited

U.S. PATENT DOCUMENTS

| | | | |
|---|---|---|---|
| 6,021,880 A | * | 2/2000 | Reed, Jr. et al. ......... 192/219.3 |
| 6,044,719 A | * | 4/2000 | Reed, Jr. et al. ............... 74/330 |
| 6,278,916 B1 | * | 8/2001 | Crombez ...................... 701/84 |
| 6,321,144 B1 | * | 11/2001 | Crombez ...................... 701/87 |

FOREIGN PATENT DOCUMENTS

| | | |
|---|---|---|
| DE | 35 34 675 | 4/1987 |
| DE | 43 15 843 | 11/1994 |
| DE | 199 49 203 | 4/2000 |

* cited by examiner

*Primary Examiner*—Willis R. Wolfe
(74) *Attorney, Agent, or Firm*—Kenyon & Kenyon

(57) ABSTRACT

A method and a device for operating an internal combustion engine for a road vehicle having an automatic transmission, it being detected if the road vehicle is rolling back while forward gear is engaged, and the ignition angle of the internal combustion engine being changed to increase the torque of the internal combustion engine when back-rolling is detected while forward gear is engaged.

9 Claims, 2 Drawing Sheets

METHOD AND DEVICE FOR OPERATING AN INTERNAL COMBUSTION ENGINE

The invention relates to a method and a device for operating an internal combustion engine for a road vehicle having an automatic transmission, it being detected if the road vehicle is rolling back while forward gear is engaged.

Such a method and device, respectively, are known from the German Patent 35 34 675 C2.

The object of the present invention is to further improve the above-indicated method and device.

The objective is achieved according to the invention by a method as recited in claim 1 and by a device as recited in claim 9. In this context, for operating an internal combustion engine for a road vehicle having an automatic transmission, it is detected whether there is back-rolling while forward gear is engaged, and upon detecting that the road vehicle is rolling back, the ignition angle of the internal combustion engine is altered to increase the engine torque. Thus, if back-rolling or the beginning of back-rolling is detected with forward gear engaged, then the ignition angle of the internal combustion engine is changed in such a way that the torque of the internal combustion engine is increased. In this manner, possible back-rolling of the road vehicle is eliminated more quickly and effectively than with the known method.

In an advantageous refinement of the invention, more air is metered into the internal combustion engine when it is detected that there is back-rolling with forward gear engaged. This additional measure effectively prevents back-rolling, even when there is a sharp incline.

One advantageous development of the invention provides for metering more air into the internal combustion engine when, after changing the ignition angle of the internal combustion to increase the engine torque, back-rolling is detected when forward gear is engaged.

In a further advantageous embodiment of the invention, a calculation is made of the increase in torque of the internal combustion engine necessary for preventing the road vehicle from rolling back while forward gear is engaged.

In another advantageous invention refinement, the increase in torque of the internal combustion engine which is possible by changing the ignition angle of the internal combustion engine is calculated.

A further advantageous development of the invention provides for metering more air into the internal combustion engine when the increase in torque of the internal combustion engine necessary for preventing the road vehicle from rolling back when forward gear is engaged is greater than the increase in internal-combustion-engine torque which is possible by changing the ignition angle of the engine.

According to another advantageous embodiment of the invention, the air is metered in with the aid of a bypass adjuster or by an electrically controllable throttle device (ETC) [electronic throttle control].

Further advantages and particulars are described in the following description of exemplary embodiments. In detail:

Figure 1:
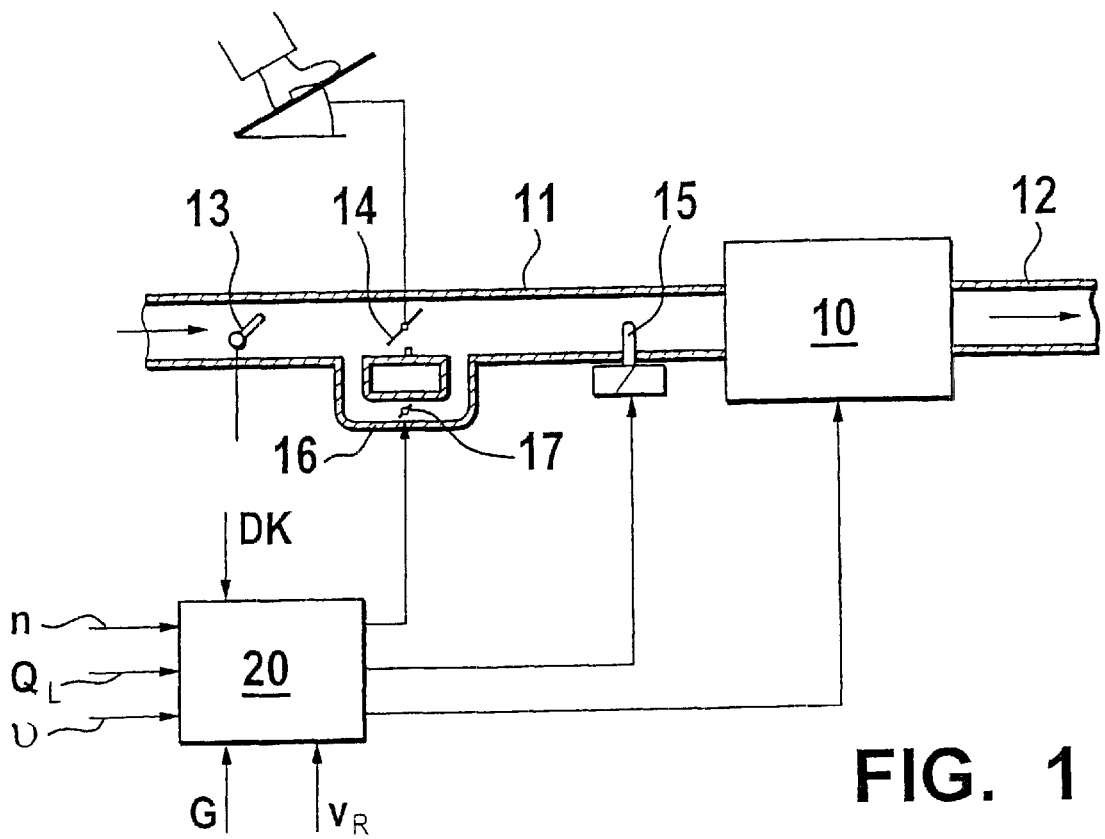
FIG. 1 shows a rough schematic representation of an internal-combustion-engine control system.
Figure 2:
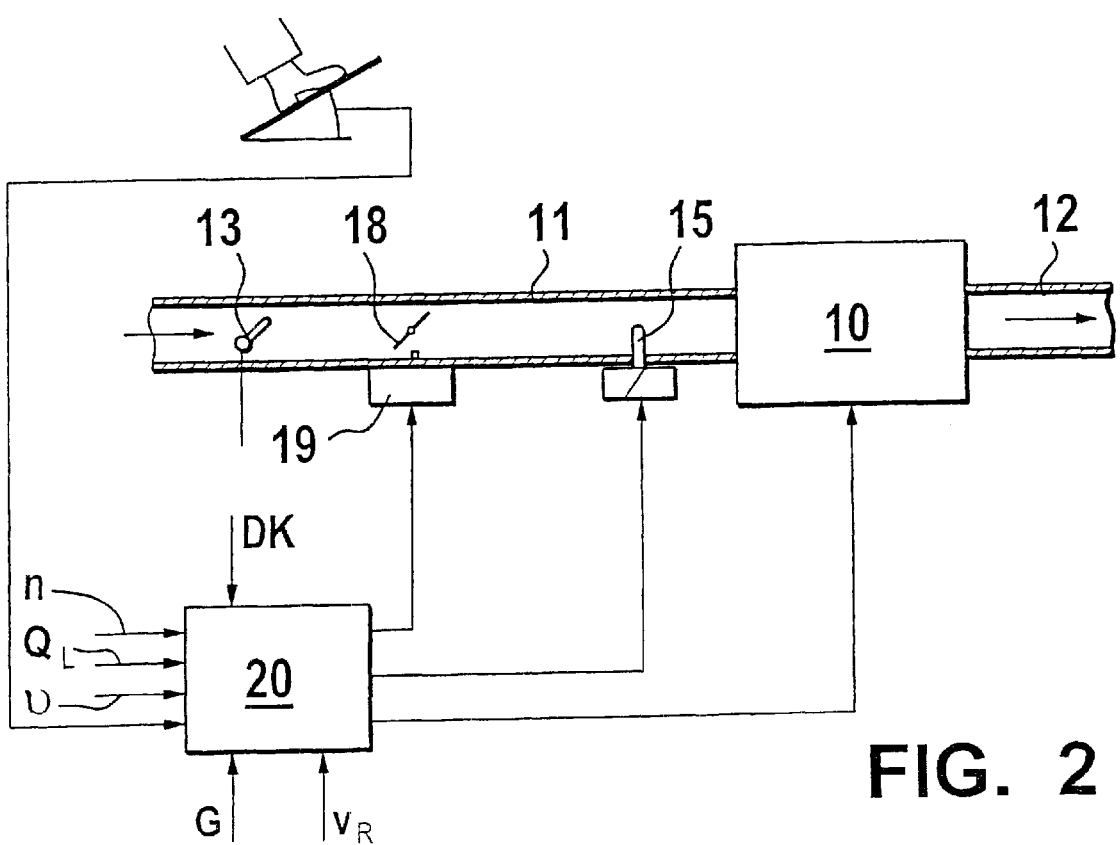
FIG. 2 shows a rough schematic representation of an alternative internal-combustion-engine control system.

The exemplary embodiments in FIGS. 1 and 2 relate to an internal-combustion-engine control system having a fuel-injection installation and a charge adjustment. In FIGS. 1 and 2, reference numeral 10 indicates an internal combustion engine, 11 indicates an air-intake pipe, and an exhaust pipe is indicated by 12. Disposed one behind the other in air-intake pipe 11, when viewed in the direction of flow, is a measuring device 13 for 14 and a fuel injector 15. Parallel to throttle valve 14 is a bypass channel 16, in which is disposed a bypass adjuster 17 for changing the bypass cross-section. As an alternative to bypass channel 16, in which a bypass adjuster 17 is arranged for changing the bypass cross-section, it is possible to provide an electrically controllable throttle device (a so-called ETC), as shown in FIG. 2, which is used to meter in the air. The electrically controllable throttle device has a throttle valve 18, as well as an electric servomotor 19 for adjusting throttle valve 18. Electric servomotor 19 is controlled by an electronic control unit, designated by reference numeral 20, for controlling internal combustion engine 10. By suitable control using electronic control unit 20, the electrically controllable throttle device replaces throttle valve 14 and bypass channel 16 in which bypass adjuster 17 is arranged.

Electronic control unit 20 receives, inter alia, signals with respect to speed n of internal combustion engine 10, load $Q_L$ of internal combustion engine 10, throttle-valve position DK and temperature u. Electronic control unit 20 also receives a signal G concerning the transmission setting, as well as a value, having an operational sign, for speed $V_R$ of at least one wheel of the road vehicle.

A driving signal for electromagnetic fuel injector 15 is formed in electronic control unit 20 as a function of speed n and load $Q_L$ of internal combustion engine 10. While the throttle valve is closed, electronic control unit 20, with the aid of an idle-speed control, assures that the idling speed can be held to a low-value.

In addition, electronic control unit 20 evaluates the value, having an operational sign, for speed $V_R$ of at least one wheel of the road vehicle, and signal G concerning the transmission setting, and thus ascertains an (unintentional) back-roll, accompanied by engaged forward gear. If it is detected that there is a back-roll when forward gear is engaged, electronic control unit 20 changes the ignition angle of the internal combustion engine in such a way that the engine torque is increased. If, in spite of this measure, electronic control unit 20 detects that the vehicle is rolling backward while forward gear is engaged, then it drives bypass adjuster 17 in bypass channel 16 for throttle valve 14 in a manner that the bypass cross-section is enlarged (FIG. 1), or it drives the electrically controllable throttle device in a manner that the opening of throttle valve 18 is enlarged (FIG. 2), to thus produce an increased torque in internal combustion engine 10, which in turn then prevents the vehicle from rolling backwards at the incline.

If, on the other hand, in the alternative to bypass channel 16 in which a bypass adjuster 17 is arranged for changing the bypass cross-section, an electrically controllable throttle device is provided, then the throttle device is opened to such an extent that an increased torque is produced in internal combustion engine 10, such that the vehicle is prevented from rolling backward at the incline.

Figure 3:
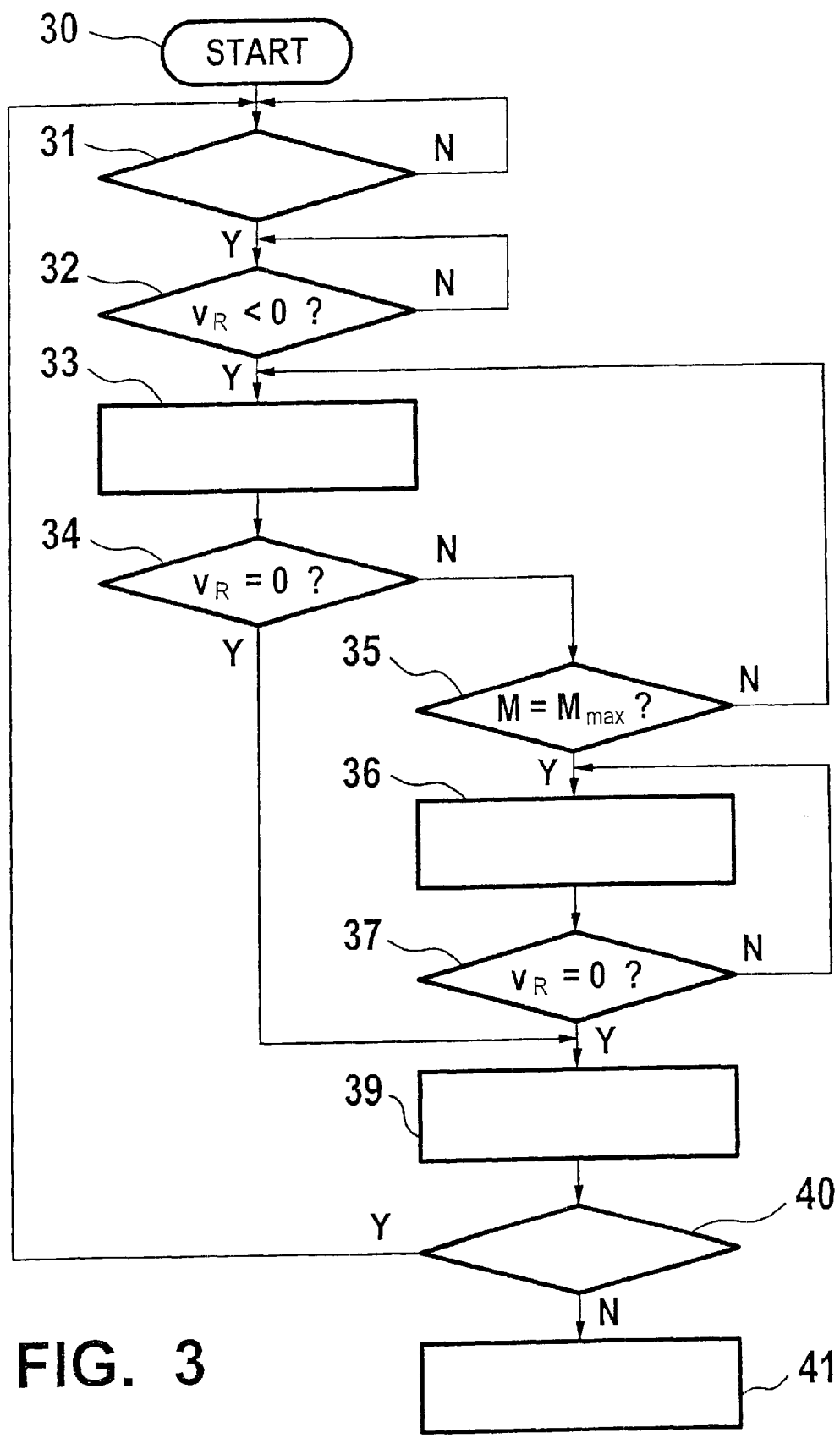
FIG. 3 shows a flow chart for describing an exemplary embodiment of the design approach according to the present invention.

FIG. 3 shows a subroutine, which can be implemented on electronic control unit 20, for the exemplary realization of the method according to the present invention. Reference numeral 30 indicates the start of the subroutine. A query as to whether the transmission is in a forward gear is indicated by 31. If this is the case, a speed query 32 then follows with regard to a negative speed, which corresponds to the vehicle rolling backwards. If a backward-roll exists, i.e. $V_R<0$, then the ignition angle of internal combustion engine 10 is altered by block 33 in the direction toward an increase in the torque of internal combustion engine 10. If speed query 34 ascertains the end of the backward rolling, and thus a speed equal to zero, then the relevant value for the ignition angle is retained in block 39, further interventions still naturally being possible, however, to prevent, for example, load fluctuations because of switching an air-conditioning compressor on or off. If speed query 34 reveals that the backward rolling has not ended, then, using a torque query 35, it is checked whether torque M of internal combustion engine 10 has reached maximum torque $M_{max}$ attainable by only changing the ignition angle of internal combustion engine 10.

If backward rolling continues and torque M of internal combustion engine 10 has reached maximum engine torque $M_{max}$ attainable by changing only the ignition angle of internal combustion engine 10, then the bypass cross-section of bypass adjuster 17 in FIG. 1 is increased with the aid of block 36 and a subsequent speed query 37, until subsequent speed query 37 ascertains the end of back-rolling, and thus a speed equal to zero. This value of the corresponding driving signal for bypass adjuster 17 is then retained in block 39, further interventions still naturally being possible, however, to prevent, for instance, load fluctuations because of switching an air-conditioning compressor on or off. In an implementation according to FIG. 2, blocks 36 and 39 must be adapted accordingly. Thus, throttle valve 18 is opened further until speed query 37 ascertains the end of back-rolling, and thus a speed equal to zero. The value of the corresponding driving signal for servomotor 19 is then retained in block 39.

A further query 40 follows, to the effect that the accelerator is not depressed (accelerator position 0) or as to whether throttle valve 14 is closed. As long as this is the case, the subroutine is run through continuously; otherwise there is a return to the main program, according to the data in block 41.

Alternatively to the logic existing with respect to block 33, speed query 34 and torque query 35, provision can be made to calculate the increase in torque of the internal combustion engine necessary to prevent the road vehicle from rolling back with forward gear engaged, and to increase the ignition angle accordingly. If the increase in torque of the internal combustion engine necessary to prevent the road vehicle from rolling back while forward gear is engaged is greater than the increase in torque of the internal combustion engine possible by changing the ignition angle of the internal combustion engine, then the ignition angle is adjusted in such a way that the torque of the internal combustion engine assumes its maximum value attainable by changing only the ignition angle of the internal combustion engine. In addition, more air is metered into the internal combustion engine, i.e., the loop composed of block 36 and the speed query is run through.

What is claimed is:

1. A method for operating an internal combustion engine (10) for a road vehicle having an automatic transmission, it being detected if the road vehicle is rolling back while forward gear is engaged, characterized in that the ignition angle of the internal combustion engine (10) is changed to increase the torque (M) of the internal combustion engine (10) when back-rolling is detected with forward gear engaged.

2. The method as recited in claim 1 characterized in that more air is metered into the internal combustion engine (10) when, after changing the ignition angle of the internal combustion engine (10) to increase the torque of the internal combustion engine (10), back-rolling is detected with forward gear engaged.

3. The method as recited in claim 1, characterized in that more air is metered into the internal combustion engine (10) when the increase in torque (M) of the internal combustion engine (10) necessary to prevent the road vehicle from rolling backwards while forward gear is engaged is greater than the increase in torque ($M_{max}$) of the internal combustion engine (10) possible by changing the ignition angle of the internal combustion engine (10).

4. The method as recited in claim 1, characterized in that a calculation is made of the increase in torque of the internal combustion engine (10) necessary to prevent the road vehicle from rolling backwards when forward gear is engaged.

5. The method as recited in claim 4, characterized in that a calculation is made of the increase in torque of the internal combustion engine (10) which is possible by changing the ignition angle of the internal combustion engine (10).

6. The method as recited in claim 1, characterized in that more air is metered into the internal combustion engine (10) when back-rolling is detected with forward gear engaged.

7. The method as recited in claim 6, characterized in that the air is metered in with the aid of a bypass adjuster (17).

8. The method as recited in claim 6, characterized in that the air is metered in with the aid of an electrically adjustable throttle device.

9. A device for operating an internal combustion engine (10) for a road vehicle having an automatic transmission according to a method as recited in one of the preceding claims, it being detected if the road vehicle is rolling back while forward gear is engaged, characterized in that the device for operating the internal combustion engine (10) has an electronic control unit (20) for changing the ignition angle of the internal combustion engine (10) upon detecting that the road vehicle is rolling backwards while forward gear is engaged, in such a way that the torque of the internal combustion engine (10) is increased.

\* \* \* \* \*